United States Patent [19]

Scott-Jackson et al.

[11] Patent Number: 4,958,071

[45] Date of Patent: Sep. 18, 1990

[54] A JOYSTICK INCLUDING AN OPTICAL ENCODER WITH FILM STRIPS IN SLIDING CONTACT

[75] Inventors: Dennis Scott-Jackson; Harry Skibbe, both of Burnaby, Canada

[73] Assignee: Advanced Gravis Computer Technology, Ltd., Burnaby, Canada

[21] Appl. No.: 296,784

[22] Filed: Jan. 13, 1989

[51] Int. Cl.⁵ .................... G01D 5/34; G01V 9/04
[52] U.S. Cl. ................... 250/229; 250/231.16
[58] Field of Search ............... 250/229, 231 SE, 221, 250/211 K, 237 G, 231.13, 231.14, 231.16, 231.18; 341/13; 340/709; 364/190; 33/706, 707; 324/175; 356/374

[56] References Cited

U.S. PATENT DOCUMENTS

| | | | |
|---|---|---|---|
| 3,723,748 | 3/1973 | Coburn et al. | 324/175 |
| 3,742,486 | 6/1973 | Skidmore | 324/175 |
| 3,770,970 | 11/1973 | Trump | 250/237 G |
| 3,892,961 | 7/1975 | Bachmann | 250/211 K |
| 4,148,014 | 4/1979 | Burson | 340/709 |
| 4,172,994 | 10/1979 | Bergkuist | 250/237 G |
| 4,339,198 | 7/1982 | Leuchter, Jr. | 250/237 G |
| 4,616,833 | 10/1986 | Geller | 250/231 SE |
| 4,650,332 | 3/1987 | Muraoka et al. | 356/374 |
| 4,654,523 | 3/1987 | Tanaka et al. | 250/231 SE |
| 4,716,399 | 12/1987 | Nordlund | 341/13 |
| 4,722,600 | 2/1988 | Chiang | 356/374 |
| 4,731,530 | 3/1988 | Mikan | 250/231 SE |

OTHER PUBLICATIONS

Optoelectronics Division, TRW Electronic Components Group, Application Bulletin 116, 1985, pp. 374–5.

Primary Examiner—David C. Nelms
Assistant Examiner—Michael Messinger
Attorney, Agent, or Firm—Shlesinger & Myers

[57] ABSTRACT

An optical encoder having a concentric cylindrically disposed reticle and moving unit with each having alternating transparent and opaque regions. A light emitter is located in each of two windows on one side of the recticle and moving unit while a light sensor is located on the other. The spacing of transparent and opaque regions in the reticle relative to that in the moving unit is such that when the transparent regions in one window are aligned those in the other unit are sufficiently non-aligned to produce quadrature and enable detection of both motion and direction of motion.

21 Claims, 7 Drawing Sheets

A JOYSTICK INCLUDING AN OPTICAL ENCODER WITH FILM STRIPS IN SLIDING CONTACT

BACKGROUND OF THE INVENTION

The present invention relates to an optical encoder for generating output pulses in number proportional to the amount of preselected movement of a coupled analog component.

An encoder is an electromechanical device to measure the position, velocity, acceleration, etc. of an operating mechanism to which the encoder is coupled. Optical encoders utilize light as a means for transmitting information about mechanical movement to a detector which outputs a number of electrical pulses dependent on the amount of movement of the operating mechanism.

Encoders may be linear or rotary. Both utilize a moving unit having alternating strips of transparency and opacity to the light path. The size, shape and frequency of these areas determines the number and rate of the output pulses for a given movement of the operating mechanism. A common moving unit is in the form of a disc having a plurality of short radially directed spaced apart openings around its periphery. A light emitting diode (LED) directs light onto the disc and a photosensor located in the opposite side of the disc detects transmitted light giving an output proportional to the intensity of light transmitted through each open region. Such an encoder in combination with a counter for storing the number of sensor output pulses measures only the magnitude of movement, the speed, etc. but not the direction. Moreover, such discs provide a resolution of less than 50 lines per inch around the disc periphery. Greater resolution is possible using chrome on glass but at a greatly increased cost.

Mylar film can also be used to obtain higher resolution but offers poor mechanical, thermal and humidity stability and is easily damaged by handling.

Resolution may be improved by using a reticle having a pattern of transparent and opaque areas which are optically mated to those patterns on the moving unit. As the moving unit moves relative to the reticle which is stationary, alternating alignment and non-alignment of the transparent regions causes the transmitted light intensity to rise and fall. If the size of the transparent and opaque regions are equal then the degree of fluctuation of the transmitted light will be maximized.

In order to determine direction of movement of the moving unit one can locate two LED's and two corresponding sensors with one sensor detecting light transmitted through a first reticle opening and a second sensor detecting light transmitted through a second reticle opening. By shifting the second reticle opening such that it is ¼ cycle from the pattern in the first reticle a phase shift in the output from the second detector relative to the first is achieved. This phase shift reverses when the direction of the moving unit reverses.

There has been a severe problem in attempting to make high resolution encoders capable of quadrature at a reasonable cost. This difficulty arises because of many requirements. First, the spacing between the moving unit and reticle must be as small as possible and should not vary. The thickness of the moving unit and reticle must be small enough to minimize diffraction along the edges and yet be thick enough to cut down light transmission significantly. The tolerance in spacing of the transparent and opaque regions must be low. The material used must be stable against changes in humidity, have a low temperature coefficient of expansion and be sufficiently rugged to withstand handling. Hitherto, rotary encoders having a large number of lines per inch (400 or more) meeting the above requirements have only been built with great difficulty and usually individual adjustment.

Optical encoders have been utilized in track balls which consist of a large steel ball rotatably mounted on a casing. Clutch discs contact the ball at orthogonal positions relative to the center of the ball and couple to a pair of respective rotary encoders which employ a disc. Because of the use of the disc the height of the casing is necessarily relatively large to accommodate the diameter of the disc. Moreover, only a simple encoder is used. A similar encoder is used in a "mouse" which is a casing having a large ball which is adapted to roll over a table top. To date these have been the only known units for generating input control data for a computer using optical encoders.

Accordingly, it is an object of the present invention to provide an improved low cost optical encoder.

It is a further object of the invention to provide an encoder of substantially higher resolution than those used in present computer analog input devices and capable of quadrature.

It is yet a further object of the invention to provide an improved joystick which has a low profile and capable of high resolution and able to generate information as to motion and direction of motion.

SUMMARY OF THE INVENTION

According to the invention there is provided an optical encoder for generating input control data for a processor or computer. The encoder includes a base, a rotor rotatably attached to the base and a pair of window chambers affixed to the base. A reticle having alternating transparent and opaque areas is mounted in a cylindrically disposed position on the base. A moving unit cylindrically disposed to and concentric with the reticle also having alternating transparent and opaque areas is attached to the rotor. The moving unit is movable with respect to the reticle such that alternating opaque and transparent regions of the moving unit and the reticle come into and out of alignment. A light emitting means is located in each of the chambers and light sensing means are also in each of the chambers on a side of the reticle and moving unit opposite to that of the light emitting means. As the moving unit is moved relative to the reticle, the transparent regions of the moving unit move into full alignment with the transparent regions of the reticle in one of the windows while in the other of the windows the transparent regions of the moving unit are sufficiently non-aligned with those of the reticle such that light transmission through the other window is substantially reduced from that in the one window. Each of the reticle and moving unit are photographic film strips with alternating exposed and unexposed bands transverse to the length of the strips, corresponding to the opaque and transparent regions, respectively. Films are in sliding contact with one another so that operation of the encoder are not affected by reflections due to a gap between the strips.

Advantageously, the transparent and opaque regions are linear, of constant width and transverse to the length of the associated moving unit and reticle.

Preferably, the reticle and moving unit are each strips of photographic film having alternating exposed and unexposed linear regions transverse to the length thereof forming the transparent and opaque regions. The thickness of each of the films is approximately 5/1000 of an inch.

Utilization of high resolution optical encoding in the environment of a joystick is hitherto not known, possibly due to the difficulties in achieving stability, mechanical reliability and dimensions which are sufficiently small to allow their inclusion in the restricted dimensions of a joystick case all at a relatively low cost. By using a cylindrical geometry a more preferred location of the optical components may be employed to achieve relatively small dimensions. By employing photographic film with alternating exposed and unexposed linear bands transverse to the length of the film strips it is possible to achieve a large number of lines per inch of exposed regions at minimal cost. Moreover, such film can be made to contact an adjacent film with essentially no air gap between the interface so as to avoid undesirable reflections therefrom. A film thickness of 0.005 inches is sufficient to reduce the transmission of light through unexposed regions to a sufficient extent so that clear resolution between aligned and unaligned regions of the film is possible. Utilizing a constant spacing between the exposed and unexposed regions on each film with a pre-selected spacing on each film maximizes the difference in light transmission between aligned and non-aligned regions in each window. As the moving unit film is caused to rotate relative to the reticle in first one window and then the other window the resultant signal by the light sensing detectors in each window produces a wave form that is periodic. A hardened film on the strips between their contacting surfaces avoids scratches.

In another aspect of the invention there is provided a joystick which includes a casing, operating means coupled to the casing for developing movement translatable into two dimensions and an optical encoder affixed to the casing. The optical encoder has a base, a rotor rotatably attached to the base and coupled to the operating means and a pair of window chambers affixed to the base. A reticle is mounted on the base in a cylindrically disposed position traversing each of the window chambers and having alternating transparent and opaque areas. A moving unit mounted on the rotor is also cylindrically disposed and concentric with and juxtaposed to the reticle. The moving unit has alternating transparent and opaque areas substantially matching those of the reticle but spaced such that alternating opaque and transparent regions of the moving unit and reticle come into and out of alignment and such that as said moving unit is moved past said reticle, a periodic ouput response by each light sensing means results with the transparent regions of the moving unit becoming fully aligned with those of the reticle in one of the windows and 90 degrees out of alignment in another of the windows. Light emitting means are located in each window to direct light onto the reticle and moving unit and light sensing means are located on an opposite side of the reticle and moving means to detect transmitted light in each window. The coupling between the operating means and the optical encoder is such as to rotate the rotor through an angle substantially linearly proportional to an angle of pivoting of the lever in a predetermined plane.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS

The present invention is particularly useful in a joystick, an example of which is shown in FIGS. 1-6.

Figure 1:
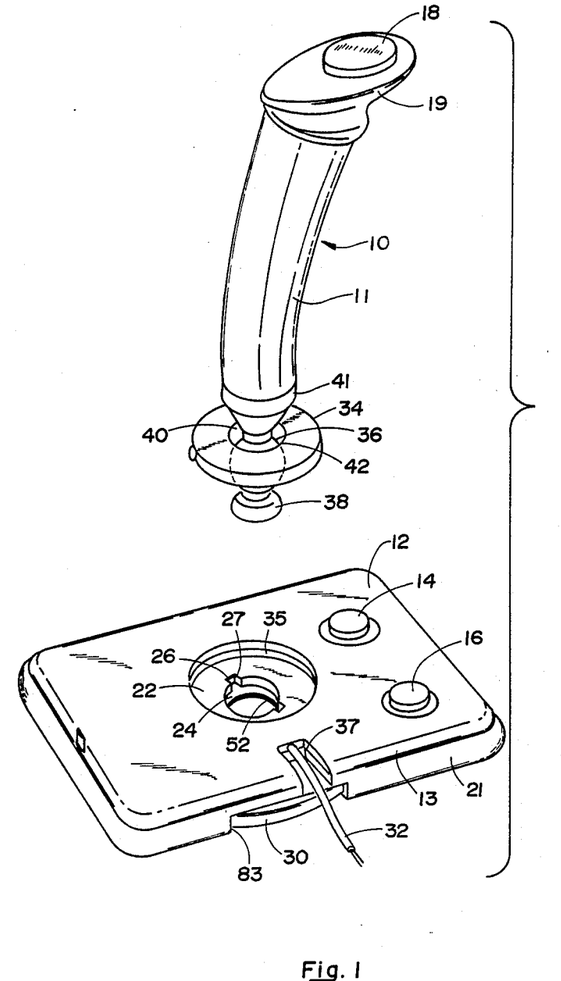
FIG. 1 is a perspective view showing the casing and the handle in exploded form.
Figure 2:
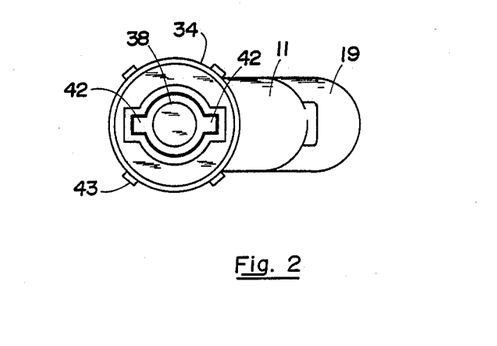
FIG. 2 is a front elevation view of the handle and handle collar.

The joystick as shown in FIG. 1, in exploded form, consists of a handle 10 coupled to a casing 12 having an upper casing section 13 and a bottom casing section 21. The handle 10 includes a padded handle grip 11, a thumb button housing 19 at the top of which is located a thumb microswitch button 18. Below the handle grip 11 is a handle housing 41 which supports a handle ball 36 having two oppositely disposed ball pins 42 and a gimbal ring actuating sphere 38.

Figure 3:
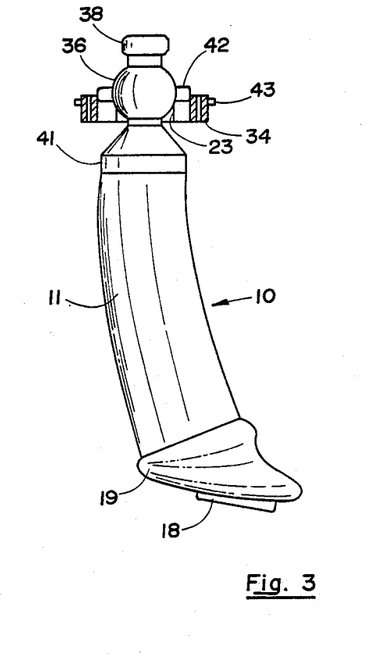
FIG. 3 is a side elevation view of the handle with the collar in section.

An annular handle collar 34 fits between handle housing 41 and handle ball 36. Collar 34 includes a pair of oppositely disposed ball pin collar slots or keyways 40 which slidably receive ball pins or keys 42. As shown in FIG. 3, collar 34 has a sloped interior surface 23 which abuts ball 36 and permits pivotal motion of the handle 10 in a spherical arc but prevents rotation thereof when the pins 42 are engaged with slots 40.

Figure 4:
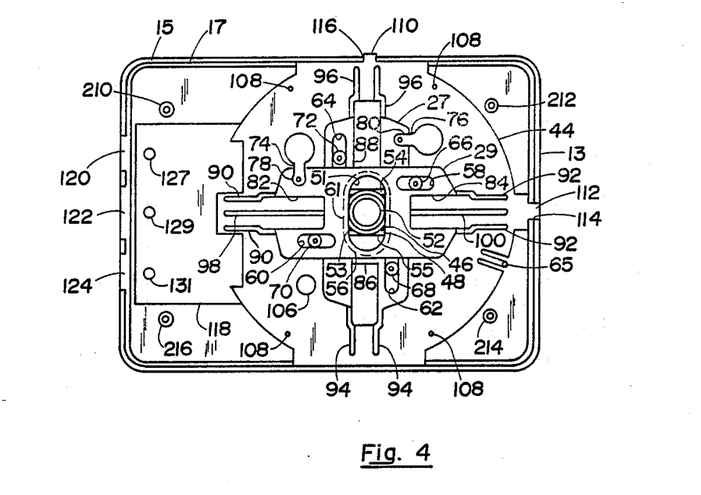
FIG. 4 is a bottom view of the casing assembly showing the gimbal plates and printed circuit board.

Casing 12 houses a base plate 44 (see FIGS. 4 and 5) which has a collar receptacle 22 formed on an upper surface thereof and a ball base plate contact surface 24 which contacts ball 36. Contact surface 24 has formed therein two oppositely disposed ball pin base plate slots or keyways 26 dimensioned and positioned to slidably receive ball pins or keys 42. Below the base plate 44 is mounted a pair of gimbal plates 27 and 29 (see FIG. 4). Annular gimbal ring or bushing 52 is mounted between a pair of overlapping central plate openings 51 and 53 as shown in FIG. 4. Actuating sphere 38 passes into annular ring 52 and engages the latter.

Collar 34 has a plurality of radially spaced apart receptacle keys 43 which are positioned and dimensioned to be snugly slidably received in receptacle keyways 35. A pair of firing buttons 14 and 16 are mounted on the casing to actuate microswitches 136 and 138 (see FIG. 5) located within the casing 12. A cable 32 housing a plurality of electrical leads passes in to the casing 12 through a cable guard 37 that prevents movement of the cable 32 into or out of the casing 12. The tensioning wheel 30 is rotatably mounted within the casing 12 and extends through slots 81 and 83 in the latter to provide adjusting surface portions thereof.

As shown in FIG. 4, a base plate 44 is mounted as an upper casing section 13 by means of a locate lip or positioning tab 110 snugly, slidably insertable into a lip or tab receptacle 116 in casing section 134 and a locate or positioning plug 112 snugly, slidably insertable into a plug receptacle 114. At one end of the base plate 44 there is affixed a printed circuit board 118 having three rotary wheel apertures 127, 128 and 131. The bottom edge of the upper casing section 13 has an upper casing rim 15 which extends below an upper casing shoulder 17 adjacent to, but interior with respect to the rim 15.

Three rim slots 120, 122 and 124 are formed opposite the corresponding rotary wheel apertures 127, 129 and 131, respectively.

Figure 5:
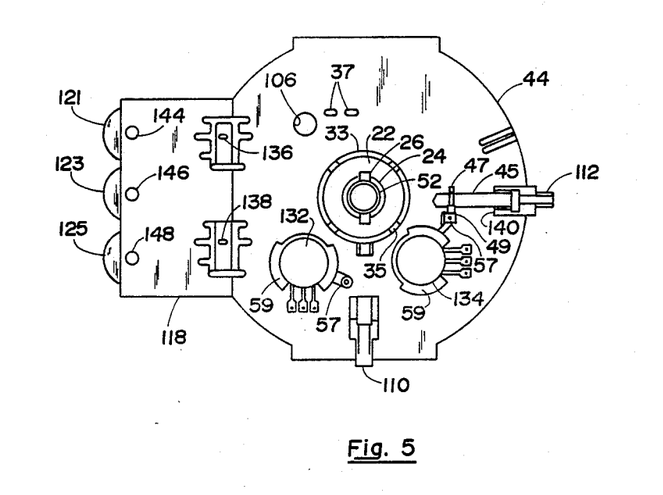
FIG. 5 is a plan view of the base plate and printed circuit board.

The bottom surface of base plate 44 has four radially disposed wheel guide pins 108. Also formed in the bottom of base plate 44 are a plurality of radially outwardly directed base plate spring walls 90, 92, 94 and 96. Intermediate spaced apart walls 90 and 92 are central positioning ribs 98 and 100, respectively. A pair of orthogonally disposed gimbal plates 27 and 29 each have a pair of arcuate slots 64 and 62, and 58 and 60, respectively formed therein. Posts 66, 68, 70 and 72, respectively, slidably fit through corresponding slots 58, 60, 62 and 64, respectively. Thus, the gimbal plates 27 and 29 are orthogonally slidable with respect to one another. Each of gimbal plates 27 and 29 has a pair of opposed rectangular slots 86 and 88, and 82 and 84, respectively. Along an edge parallel to the direction of sliding movement on each of corresponding gimbal plates 27 and 29 is formed a U-shaped slot 78 and 80, respectively, which slots are adapted to slidably receive an end of lever arms 74 and 76, respectively. Lever arms 74 and 76 are coupled to the wiper arms of potentiometers 132 and 134 as shown in FIG. 5. Thus, rotation of the lever arms 74 and 75 causes movement of corresponding wiper arms of potentiometers 132 and 134, respectively.

Lower gimbal plate 29 has a central outer opening 61 and a concentric slightly smaller inner opening 51 joined by a lower gimbal plate shoulder 56. Similarly, a spaced apart upper gimbal plate 27 has an upper gimbal plate shoulder 54 joining an outer opening 55 and a concentric inner opening 53.

Gimbal ring or bushing 52 has a pair of oppositely disposed small sleeves 46 and a single central large sleeve 48. Large sleeve 48 is slidable on shoulders 54 and 56, respectively. Four posts 210, 212, 214 and 216 are spaced proximate the corners of upper casing section 13. A hole 106 in base plate 44 provides an access support for leading electrical cable from one side of plate 44 to the other.

The upper surface of base plate 44, as illustrated in FIG. 5, contains a cylindrical collar receptacle wall 33 forming a collar receptacle wall 33 and accommodates receptacle keys 43.

Locate or positioning plug 112 is formed so as to accommodate an adjusting screw 45 between two spacing legs 140. On a threaded end of screw 45 is registered a nut 47 having a fork end 49. Fork end 49 fits into a slot (not shown) in a post 57 which prevents rotational movement of nut 47 in response to rotation of screw 45. Post 57 is integral with a sleeve 59 capturing potentiometer 134 in a firm, non-slipping engagement. A similar arrangement (not shown) is used with respect to locate lip or positioning tab 110 and potentiometer 132.

Printed circuit board 118 has mounted thereto a pair of microswitches 138 and 136 on top of which are placed firing buttons 16 and 14, respectively. Rotary wheel switches 121, 123 and 125 having wheel axles 144, 146 and 148, respectively are mounted against the printed circuit board 118 with the axles 144, 146 and 148 slidably inserted through apertures 127, 129 and 131, respectively. A pair of contacts on each wheel 121, 123 and 125 (not shown) are used to contact a set of three different pads (not shown) on printed circuit board 118.

On the periphery of base plate 44 (as shown in FIGS. 4 and 5) is a tension ring button 65 formed at the end of a finger in the base plate 44.

Figure 6:
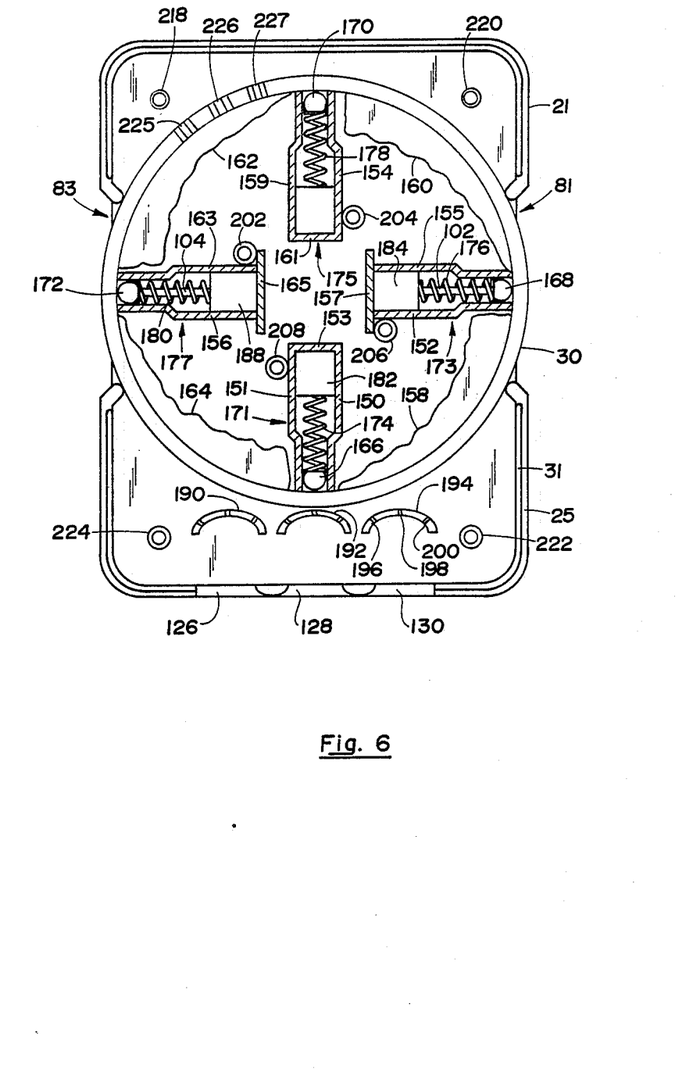
FIG. 6 is a plan view showing the spring assemblies and tensioning ring as mounted in a bottom casing section.

The tensioning wheel 30 is shown in FIG. 6 as it is mounted on a bottom casing section 21. An upper annular surface of wheel 30 rotates around the outside of wheel guide pins 108 on base plate 44 as shown in FIG. 4 and around corresponding ridges (not shown) in the bottom casing section 21. On the interior cylindrical surface of the tensioning wheel 30 there is a set of four radially spaced integral cams 158, 160, 162 and 164 having generally serpentine cam surfaces. On the bottom casing there is formed a set of four equally, radially spaced apart spring wells 171, 173, 175 and 177, generally directed toward a center of the tensioning wheel 30 and interior thereof. Spring well 171 is formed by vertical walls 150, 151 and 153; spring well 173 is formed by vertical walls 152, 155 and 157; spring well 175 is formed by vertical walls 154, 159 and 161; while spring well 177 is formed by vertical walls 156, 163 and 165. The walls 150 and 151 align with walls 90 on the base plate; walls 152 and 155 align with walls 96; walls 154 and 159 align with walls 92; and walls 156 and 163 align with walls 94. Sufficient space is allowed between the sets of aligned walls to permit gimbal plates 27 and 29 to slide back and forth. Spring wells 171, 173, 175 and 177 each have spring cups 182, 184, 186 and 188 slidably contained therein. Coil springs 174, 176, 178 and 180 are inserted into corresponding respective cups 182, 184, 186 and 188 and at an opposite end contact ball bearings 166, 168, 170 and 172, respectively. Radial edges of cams 158 and 162 contact walls 152 and 163, respectively, at one end of the adjustment position. The wheel 309 is rotatable in a clockwise direction as shown in FIG. 6. Casing 21 has an interior bottom casing rim 31 which extends beyond a bottom casing shoulder 25 and abuts top casing rim 15. Three rotary wheel bottom section rim slots 126, 128 and 130 are formed in bottom casing section 21 and coincide with corresponding slots 124, 122 and 120, respectively, of the top casing section 13. Three rotary switch support walls 190, 192 and 194 each forming a portion of a cylindrical wall, are located proximate corresponding slots 126, 128 and 130, respectively. Each support wall has three notches 196, 198 and 200 formed therein at radially spaced apart positions in the top edge thereof for contacting a corresponding detent is each of wheels 121, 123 and 125 in order to mark the three separate switch positions. (The detent in wheels 121, 123 and 125 are not shown.) Four bottom casing posts 218, 220, 222 and 224 disposed proximate each of the four corners of the bottom casing section 21 register with corresponding top casing posts 214, 212, 210 and 216, respectively. Screws passing through the posts 218, 220, 222 and 224 threadedly register with threaded holes in corresponding top casing posts 214, 212, 210 and 216, respectively. Base plate 44 is affixed to bottom casing 21 by means of casing posts 202, 204, 206 and 108 which register with gimbal plate guide posts 68, 66, 72 and 70, respectively are used to affix the base plate 44 to the bottom casing section 21. Spaced apart grooves 225, 226 and 227 in a top surface of tensioning wheel 30 successively engage tension ring button 65 on base plate 44 in the first three tension settings.

Formed in each long side of casing section 21 are a pair of tensioning wheel slots 81 and 83 which are used to provide user access to the tensioning wheel 30.

In operation, when handle 10 is tilted in a particular direction, ball 36 rotates against collar ball contact surface 23 and ball base plate contact surface 24. At the same time cylindrical pins 42 rotate and pivot vertically in ball pin base plate slots 26 and ball pin collar slots 40. Gimbal ring actuating sphere 38 forces gimbal ring 52 against upper and lower gimbal plate openings 53 and 51, respectively. In response, gimbal plates 27 and 29 each move in a direction determined by the movement of actuating sphere 38. Gimbal plate 27 is constrained to move in a linear direction as determined by the contact of gimbal plate slots 62 and 64 against guide posts 68 and 72, respectively. Similarly, gimbal plate 29 moves in a direction constrained by the movement of slots 58 and 60 past guide posts 66 and 70, respectively. Movement of gimbal plates 27 and 29, in turn, result in U-shaped slots 80 and 78 pivoting potentiometer coupling arms 76 and 74 respectively. The latter pivoting arms are coupled to the wiper arms (not shown) of potentiometers 134 and 132, respectively. Thus, movement of each wiper arm of each potentiometer 132 and 134 may be obtained by adjustment of a corresponding adjusting screw 45 such as that of potentiometer 134 shown in FIG. 5.

As screw 45 is rotated, nut 47 travels along the threaded portion thereof thereby moving the casing of potentiometer 134. The wiper arm at the same time is held in a fixed position by means of the U-shaped slot 890 of gimbal plate 27. A similar adjustment is available for potentiometer 132.

In the event a user desires a change in biasing on the handle 10, this is accomplished by rotation of tensioning wheel 30. As tensioning wheel 30 rotates in a clockwise position as shown in FIG. 6, cams 158, 160, 162 and 164 begin to engage ball bearings 166, 168, 170 and 172 respectively, forcing the latter to compress associated springs 174, 176, 178 and 180, respectively. This in turn causes a compression force to be generated against associated spring cups 182, 184, 186 and 188, respectively. Spring cups 182 and 186 contact gimbal plate 29 at slots 82 and 84, respectively, thereby applying opposing biasing forces to the latter. Similarly, spring cups 184 and 188 contact gimbal plate 27 at slots 86 and 88, respectively. The more tensioning wheel 30 is rotated in a clockwise direction, the more compression is applied to coil springs 174, 176, 178 and 180, thereby providing a greater biasing of gimbal plates 27 and 29 when moved from the neutral position. Alternatively, spring biasing can be disconnected altogether from the handle by simply rotating tension wheel 30 in a complete counter-clockwise direction until cam surfaces 162 and 158 abut walls 163 and 152, respectively.

As seen in FIG. 5, microswitches 138 and 136 are included to provide firing buttons. Similarly, button 18 as shown in FIG. 1 at the top end of handle 10 is provided as a fire button operable by the thumb of a user of the same hand that is used to manipulate handle 10. Button 18 actuates a microswitch (not shown) located inside thumb button housing 19. Handle 10 is hollow to permit wires t o connect to the latter microswitch (not shown).

Initially, rotary wheel switches 121, 123 and 125 are rotated to a desired position depending on the particular machine with which the joystick is to be used. Secondly, tensioning wheel 30 is adjusted to provide the desired biasing force to handle 10.

Figure 7:
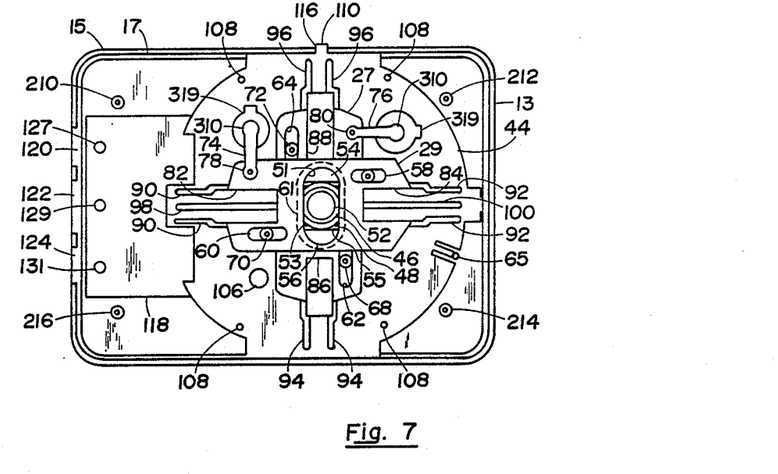
FIG. 7 is a bottom view of the casing assembly showing the gimbal plates and printed circuit board with the rotary devices in place.
Figure 8:
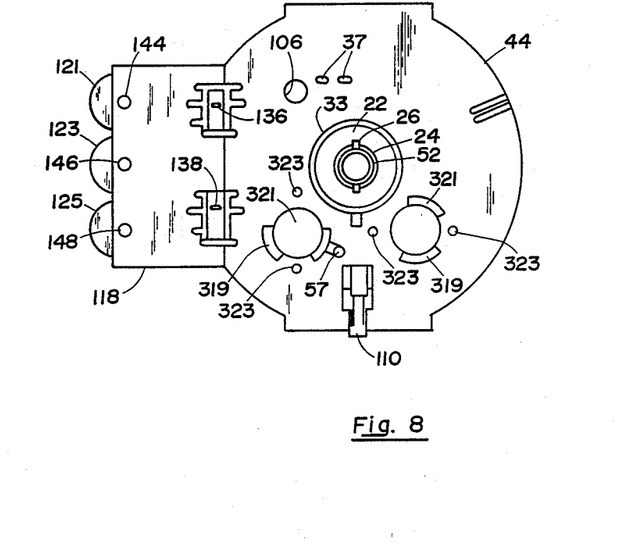
FIG. 8 is a plan view of the base plate and printed circuit board with the rotary devices in place.

The joystick of FIGS. 1–6 is modified by replacing potentiometers 132 and 134 by a rotary assembly 321 as shown in FIGS. 7 and 8. Rotary assembly 321 has a fixed portion 319 fixed to the base plate 44 by means of locate pins 323. The rotary portion 310 on each rotor assembly 321 is coupled to rotary arms 74 and 76, similar to the potentiometers of FIG. 4, and received by U-shaped slots 78 and 80, respectively. The rotary portions 310 are thus operated in a similar manner as potentiometer wiper arms.

Figure 9:
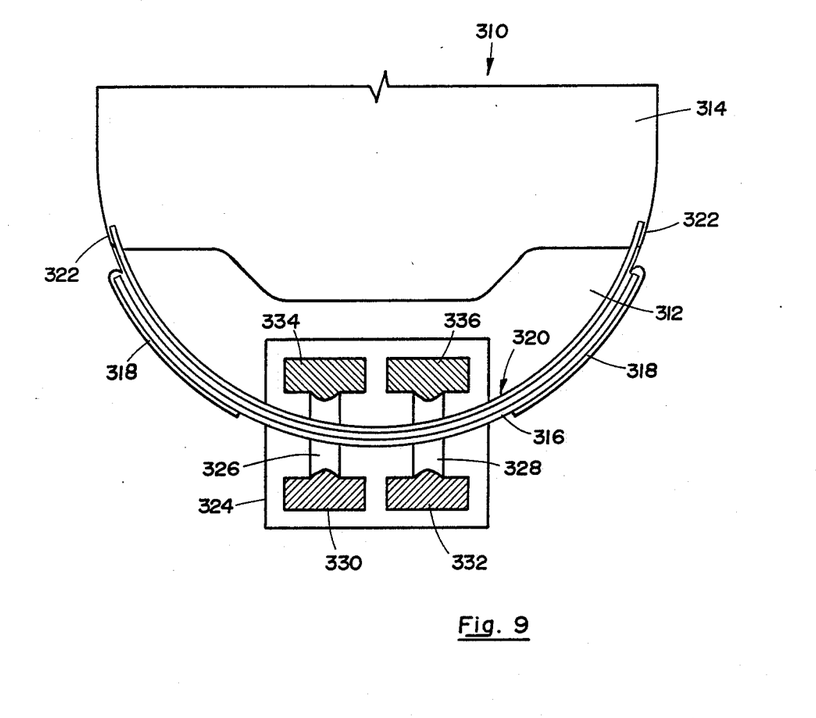
FIG. 9 is a plan view in section of a portion of the rotor.

Referring to FIG. 9, there is shown a top view of a portion of the rotor assembly 321 which includes a fixed casing 312 and a rotor 314 rotatable with respect to the casing 312. Attached to the casing 312 are a pair of reticle guides 318 for capturing and positioning a reticle 316.

A pair of slots 322 in the periphery of the rotor 314 serve to receive and maintain in position a moving unit of film 320 contiguous to the reticle strip of film 316. Both strips of film pass through window chambers 326 and 328 affixed to the casing 312. At one end of the chambers 326 and 328 are located light-emitting diodes 330 and 332 while at the other extremity, on an opposite side of the film strips 316 and 320, are located light detectors 334 and 336.

Figure 10:
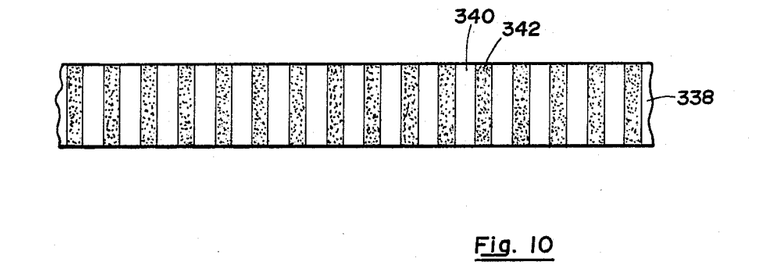
FIG. 10 is an elevation view of a strip of film having alternately exposed and unexposed regions.

As shown in FIG. 10, each of the film strips corresponding to the reticle 316 and the moving unit 320 have alternating transparent 340 and opaque 342 regions corresponding to exposed 340 and unexposed 342 regions of the film strip 338.

Figure 11:
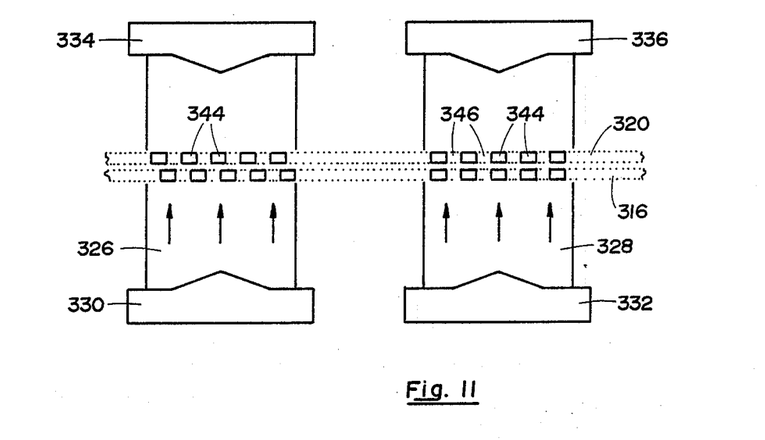
FIG. 11 is a plan view of a window chambers showing alignment of exposed regions in one window and non-alignment in the other.

Referring to FIG. 11, exposed regions 344 transparent to light and unexposed regions 346 are shown aligned in a right window chamber 328 and only partially in left window chamber 326. Consequently, light detected by light detector 336 in the right window chamber 328 gives rise to a maximum signal output whereas that in the left window chamber detected by light detector 334 gives rise to an intermediate value of signal.

As film strip 320 moves in a counter-clockwise direction relative to reticle strip 316 the exposed regions 344 in the right hand window chamber 328 move from maximum light transmission to a diminishing level of light transmission as the exposed regions gradually move away from exact alignment. At the same time the exposed regions 344 in the left hand window chamber approach maximum transmission as the exposed regions enter into exact alignment. Thus, curve 348 in FIG. 12 describes the situation as would occur in the left window chamber 326 whereas curve 350 would correspond to that in the right window chamber 328. However, for clockwise rotation in which moving unit strip 320 moves in a clockwise direction or to the left as shown in FIG. 11, the transmission in the left window chamber rather than increasing would decrease to a minimum as the exposed regions 344 moved toward complete non-overlapping positions. Thus, curve 352 would correspond to the left window chamber 326 for clockwise rotation whereas curve 354 would correspond to that of the right hand window chamber and would be substantially the same as for counter-clockwise rotation in the latter case.

It will be appreciated that there will always be a certain level of light transmission through the film but it has been found that a 5 mil thickness of film is sufficiently thick to make the difference between maximum and minimum light transmission through the film strips 316 and 320 sufficiently great to be able to distinguish between the two positions.

Figure 12:
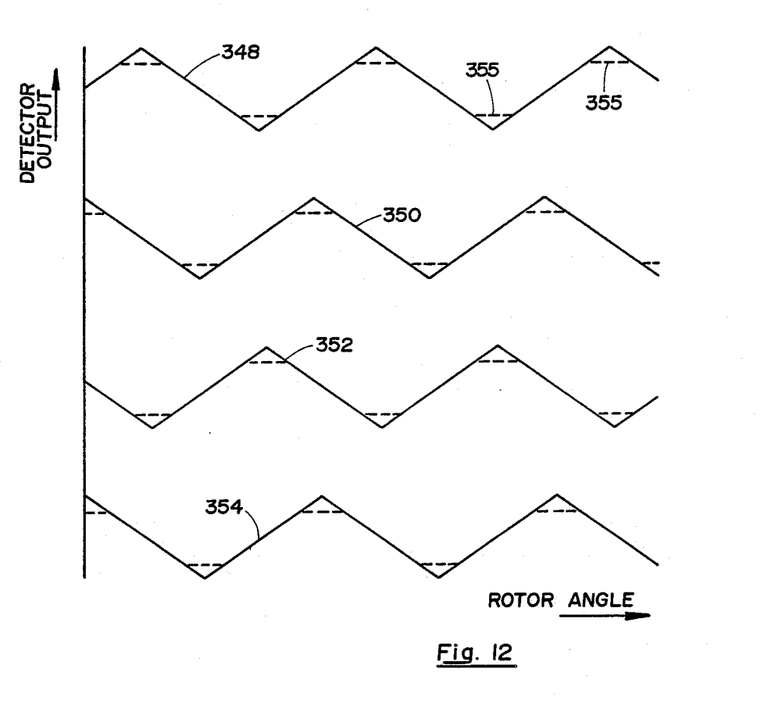
FIG. 12 are two sets of output wave forms from the two detectors in the windows corresponding to clockwise and counterclockwise rotation for respective left and right detectors.

Curves showing the output of the two detectors as a function of rotor angle as shown in FIG. 12 assume an ideal detector response in which the detector outputs are in the form of sawtooth waves. However, amplitude limiting causes the output to be as shown in the dotted lines 355. By directing the output 350 or 354 to a counter (not shown) and counting the number of pulses one can determine position of one coordinate in a two coordinate system.

In detecting the phase difference between the signal from one of detectors 334 and 336 and that from the other, one can determine the direction of rotation of the rotor and hence the direction of movement along one dimension. For example, if output 348 which lags output 350 corresponds to that from detector 330, then such an output indicates film 320 is moving to the right in FIG. 12. Similarly, output 352 corresponds to movement of film 320 to the left in FIG. 4. In addition, by recording the rate at which pulses are detected it is possible to measure velocity and acceleration.

As shown in FIG. 13, the output pulses from the light detectors may be run to a signal processing unit which will include electronic counters, analog to digital converters, switches, etc. to select position, velocity or acceleration modes as well as performing many other functions. Typically, two rotors would be installed in a single joystick casing so as to provide separate outputs for each of the two coordinate axes. By utilizing the cylindrical symmetry of the rotor it is possible to incorporate two such rotors into a relatively small, flat base structure. Moreover, the use of standard acetate photographic film permits one to obtain highly dense equispaced alternating transparent and opaque regions. The use of two such film strips provides an inexpensive, compact, accurate optical encoding system. A standard commercially available ultra violet curable lubricant on the film protects it from scratches and reduces the friction between the film strips. One can easily achieve 1200 counts for rotation through an angle of less than 70° with such a system.

Clearly, any kind of mechanical coupling between the joystick lever and each of the rotors can be implemented in order to effect rotational movement of the rotor in proportion to displacement along a selected corresponding axis.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:
1. An optical encoder, having a base, comprising:
   (a) a reticle having alternating transparent and opaque areas mountable in a cylindrically disposed position on said base;
   (b) a moving unit cylindrically disposed to and concentric with said reticle having alternating transparent and opaque areas substantially matching those of said reticle and movable with respect to said reticle through a pair of windows mounted on said base such that alternating opaque and transparent regions of said moving unit and said reticle come into and out of alignment and such that as said moving unit is moved relative to said reticle a periodic variation in light transmission through said moving unit and reticle in each window is produced and the transparent regions of said moving unit move into full alignment with the transparent regions of said reticle in one of said windows while in the other of said windows the transparent regions of said moving unit are non-aligned with those of a corresponding one of said reticles such that light transmission through the other window is substantially reduced from that in the one window and quadrature is achieved so as to permit detection of both motion and direction of motion;
   (c) light emitting means mounted on said base; and
   (d) light sensing means mounted on said base located on an opposite side of said moving unit and said reticle to said light emitting means;
wherein each of said reticle and moving unit are photographic film strips with alternating exposed and unexposed bands transverse to the length of the strips corresponding to said opaque and transparent regions, respectively, wherein the bands on one of said film strips being of equal dimensions and equispaced and having the same dimensions and spacing as those on another of said film strips and said film strips are in sliding contact with one another so that reflections from surfaces of the film strips due to air gaps between the strips is substantially reduce.

2. An encoder according to claim 1, wherein the thickness of each of said strips is approximately 5 thousandths of an inch.

3. An encoder according to claim 2, wherein said strips of film are in contact throughout each of said windows.

4. An encoder according to claim 1, wherein said transparent and opaque regions are linear, of constant width and transverse to the length of each associated moving unit and reticle;

5. An encoder according to claim 1, wherein each of said strips are coated with a transparent hardened film to inhibit scratching of contacting surfaces of said strips.

6. An encoder according to claim 1, wherein said base is opaque.

7. An encoder according to claim 1, wherein said light emitting means is a light emitting diode in each of said window chambers and said light sensing means is a photosensor mounted in each of said window chambers on a side of said reticle and moving unit opposite to light emitting means.

8. An optical encoder, comprising:
(a) a casing;
(b) operating means coupled to said casing for developing movement translatable into two dimensions;
(c) an optical encoder affixed to said casing having a base, a rotor rotatably attached to said base and coupled to said operating means and a pair of window chambers affixed to said base;
(d) a reticle mounted on said base in a cylindrically disposed position traversing each of said window chambers and having alternating transparent and opaque areas;
(b) a moving unit mounted on said rotor, cylindrically disposed to, concentric with and juxtaposed to said reticle having alternating transparent and opaque areas substantially matching those of said reticle but spaced such that alternating opaque and transparent regions of said moving unit and said reticle come into and out of alignment and such that as said moving unit is moved past said reticle, a periodic variation of light transmitted through said reticle and moving unit results in the transparent regions of said moving unit becoming fully aligned with those of said reticle in one of said windows and being non-aligned in another of said windows;
(c) light emitting means in each of said chambers for directing light onto said reticle and moving unit; and
(d) light sensing means in said window chambers for detecting light from a corresponding one of said light emitting means after its transmission through said reticle and moving unit;
wherein the coupling between said operating means and optical encoder is such as to rotate said rotor through an angle substantially linearly proportional to an angle of pivoting of said operating means in a predetermined plane; and wherein each of said reticle and moving unit are photographic film strips with alternating exposed and unexposed bands transverse to the length of the strips corresponding to said opaque and transparent regions, respectively, wherein the bands on one of said film strips being of equal dimensions and equispaced and having the same dimensions and spacing as those on another of said film strips and said film strips are in sliding contact with one another so that reflections from surfaces of the film strips due to air gaps between the strips is substantially reduced.

9. A joystick according to claim 8, wherein said reticle and moving unit are each strips of exposed photographic film with alternating exposed and unexposed regions corresponding to said transparent and opaque regions, respectively.

10. A joystick according to claim 9, wherein said reticle strip and moving unit strip are approximately 5 thousands of an inch in thickness.

11. A joystick according to claim 8, wherein said reticle strip is in contact with said moving unit strip through each of said windows.

12. A joystick according to claim 11, wherein the exposed regions on said reticle and moving unit are equi-spaced linear bands transverse to the length of each of said reticle and moving unit.

13. A joystick according to claim 12, wherein the spacing between adjacent transparent regions on said reticle are the same as those on said moving unit.

14. A joystick according to claim 13, wherein the width of transparent and opaque regions on each of said moving unit and reticle are equal.

15. A joystick according to claim 8, wherein said operating means is a lever.

16. A joystick, comprising:
(a) a casing;
(b) a lever pivotally coupled to said casing and pivotal about a point along the length thereof;
(c) a pair of optical encoders coupled to said lever so as to respond to a component of pivotal movement of said lever in each of two orthogonal planes with a first one of said pair providing a number of output pulses proportional to an angle of pivoting in one of said planes and a second one of said pair a number of output pulses proportional to an angle of pivoting in another of said planes wherein each encoder includes:
(d) a base;
(e) a rotor rotatably attached to said base and coupled to said lever;
(f) a pair of window chambers affixed to said base;
(d) a reticle mounted on said base in a cylindrically disposed position traversing each of said window chambers and having alternating transparent and opaque areas;
(b) a moving unit mounted on said rotor, cylindrically disposed to, concentric with and juxtaposed to said reticle having alternating transparent and opaque areas substantially matching those of said reticle but spaced such that alternating opaque and transparent regions of said moving unit and said reticle come into and out of alignment and such that as said moving unit is moved past said reticle, a periodic variation of light transmitted through said reticle and moving unit results with the transparent regions of said moving unit becoming fully aligned with those of said reticle in one of said windows and 90 degrees out of full alignment in another of said windows;
(c) light emitting means in each of said chambers for directing light onto said reticle and moving unit; and
(d) light sensing means in said window chambers for detecting light from a corresponding one of said light emitting means after its transmission through said reticle and moving unit;
wherein each of said reticle and moving unit are photographic film strips with alternating exposed and unexposed bands transverse to the length of the strips corresponding to said opaque and transparent regions, respectively, wherein the bands on one of said film strips being of equal dimensions and equispaced and having the same dimensions and spacing as those on another of said film strips and said film strips are in sliding contact with one another so that reflections from surfaces of the film strips due to air gaps between the strips is substantially reduced.

17. A joystick according to claim 16, wherein said reticle strip is in contact with said moving strip through each of said windows.

18. A joystick according to claim 17, wherein the exposed regions on said reticle and moving unit are equi-spaced linear bands transverse to the length of each of said reticle and moving unit.

19. A joystick according to claim 18, wherein the spacing between adjacent transparent regions on said reticle are the same as those on said moving unit.

20. A joystick according to claim 19, wherein the width of transparent and opaque regions on each of said moving unit and reticle are equal.

21. A joystick according to claim 17, wherein said reticle strip and moving unit strip are approximately 5 thousands of an inch in thickness.

* * * * *